United States Patent

Hamada et al.

[11] Patent Number: 6,088,218
[45] Date of Patent: Jul. 11, 2000

[54] ELECTROLYTIC CAPACITOR AND METHOD FOR PRODUCING THE SAME

[75] Inventors: Takahiro Hamada, Yao; Emiko Igaki, Amagasaki; Masakazu Tanahashi, Osaka; Chiharu Hayashi, Hirakata; Yasunobu Tsuji, Uji, all of Japan

[73] Assignee: Matsushita Electric Industrial Co., Ltd., Osaka, Japan

[21] Appl. No.: 09/179,710

[22] Filed: Oct. 27, 1998

[30] Foreign Application Priority Data

Oct. 31, 1997 [JP] Japan .................................... 9-316283

[51] Int. Cl.⁷ .............................. H01G 9/00; H01G 9/02
[52] U.S. Cl. ........................ 361/523; 361/525; 361/529; 29/25.03; 252/500
[58] Field of Search ...................................... 361/502–504, 361/509, 523–525, 529, 532; 29/25.03; 252/500

[56] References Cited

U.S. PATENT DOCUMENTS

| | | | |
|---|---|---|---|
| 4,697,001 | 9/1987 | Walker et al. | 528/423 |
| 4,943,892 | 7/1990 | Tsuchiya et al. | 361/525 |
| 5,119,274 | 6/1992 | Kinuta et al. | 361/525 |
| 5,187,650 | 2/1993 | Kudoh et al. | 361/525 |
| 5,424,907 | 6/1995 | Kojima et al. | 361/532 |
| 5,455,736 | 10/1995 | Nishiyama et al. | 361/525 |
| 5,473,503 | 12/1995 | Sakata et al. | 361/525 |
| 5,567,209 | 10/1996 | Kobayashi et al. | 29/25.03 |

FOREIGN PATENT DOCUMENTS

| | | |
|---|---|---|
| 6-29159 | 2/1994 | Japan . |
| 6-310380 | 11/1994 | Japan . |
| 10-12497 | 1/1998 | Japan . |

*Primary Examiner*—Kristine Kincaid
*Assistant Examiner*—Anthony Dinkins
*Attorney, Agent, or Firm*—Merchant Gould P.C.

[57] ABSTRACT

The present invention provides a method for producing an electrolytic capacitor including a porous body of a valve metal, an oxide film on a surface of the valve metal, and a conductive polymer layer on a surface of the oxide film. The step of forming the conductive polymer layer on the surface of the oxide film includes the steps of dipping the porous body in a monomer solution; lifting the porous body from the monomer solution and dipping the porous body in an oxidizing solution; and lifting the porous body from the oxidizing solution and allowing the porous body to stand. In the step of dipping the porous body in the oxidizing solution, a period for which the porous body is dipped in the oxidizing solution is equal to or shorter than a period in which 30% of the monomer contained in pores of the porous body diffuses and flows into the oxidizing solution. Alternatively, the volume of the oxidizing solution can be less than three times that of the porous body. The above method can be performed by replacing the monomer solution and the oxidizing solution with each other. Furthermore, a temperature of the porous body is maintained at a low temperature (e.g., 10° C. or less) in the step of dipping the porous body in the oxidizing solution.

36 Claims, 8 Drawing Sheets

ELECTROLYTIC CAPACITOR AND METHOD FOR PRODUCING THE SAME

BACKGROUND OF THE INVENTION

1. Field of the Invention

The present invention relates to a method for producing an electrolytic capacitor including an electrode (anode) formed of a porous body of a valve metal such as aluminum and tantalum. In particular, the present invention relates to a method for producing an electrolytic capacitor including a conductive polymer layer as the other electrode (cathode) corresponding to the electrode (anode) formed of the valve metal.

2. Description of the Prior Art

Conventionally, a one-solution method is known as a method for forming a conductive polymer layer for an electrolytic capacitor. In the one-solution method, a mixture of a monomer solution and an oxidizing solution is introduced on an oxide film formed on a surface of a porous body of a valve metal. However, in the one-solution method, immediately after the monomer and the oxidant are mixed, a reaction therebetween (oxidation polymerization) is initiated. Therefore, the activity of the mixed solution is reduced before the mixed solution reaches the depth of the pores of the porous body. This tendency is significant when a porous body having complex pores, such as sintered tantalum, is used. Therefore, the one-solution method is disadvantageous in the formation of a conductive polymer in the depth of the pores of the porous body.

Japanese Laid-Open Patent Publication (Tokkai-Hei) No. 6-310380 discloses a one-solution method of introducing a mixed solution of a monomer and an oxidant onto an oxide film of a porous body at a low temperature, and then raising the temperature of the porous body or the mixed solution. According to this method, the amount of the conductive polymers formed in the vicinity of the center of the porous body may be equalized with that in the vicinity of the outer surface of the porous body to a better extent than the conventional one-solution method. However, in the one-solution method, the reaction cannot be stopped completely even if the monomer solution and the oxidizing solution are mixed in a low temperature. This results in an increase in the consumption of raw materials.

Therefore, generally, a two-solution method is performed. More specifically, a monomer solution and an oxidizing solution are prepared separately without being mixed with each other. Then, a porous body is dipped in the monomer solution and the oxidizing solution alternately so that a conductive polymer is formed in the pores of the porous body.

However, in the two-solution method, the solution in which the porous body is first dipped diffuses into the solution in which the porous body is secondly dipped, and thus a reaction occurs. This reaction occurring outside the porous body causes the yield of the conductive polymer adhering to the porous body to be low.

For example, Japanese Laid-Open Patent Publication (Tokkai-Hei) No.6-29159 discloses the following method. For example, a porous body is dipped in an oxidizing solution and a monomer solution in this order for 5 minutes each, and then taken out from the solutions. Thereafter, the porous body is allowed to stand in the air for 30 minutes during which polymerization of the monomer proceeds.

In this method, a large amount of the oxidant introduced into the porous body flows into the monomer solution so as to contaminate the monomer solution. In addition, the yield of the conductive polymer is not high.

Japanese Laid-Open Patent Publication (Tokkai-Hei) No.7-130579 discloses the following method. For example, a porous body is dipped in a monomer solution (aniline solution) for 30 seconds, allowed to stand at room temperature in the air for 10 minutes, dipped in an oxidizing solution for 30 seconds, and allowed to stand at room temperature in the air for 30 minutes to cause polymerization.

According to this method, the solvent in the monomer solution introduced first is volatilized so as to concentrate the monomer solution, and then the porous body is dipped in the oxidizing solution. Therefore, the outflow of the monomer solution can be suppressed. However, the above step cannot to applied to a monomer that is volatilized readily.

The two-solution method also poses the problem that a conductive polymer is hardly formed on an oxide film in the deeper portion of a porous body. In particular, when a monomer having a high polymerization rate such as pyrrole is used, a reaction proceeds rapidly when a porous body that has been dipped in one solution is dipped in the other solution. This rapid reaction makes it difficult to form a conductive polymer on an oxide film in the depth of the pores of a porous body. In order to coat the internal portion of the porous body with a conductive polymer layer so as to obtain full inherent capacitance, a large number of repetitions of a series of steps are required. In some cases, the conductive polymer may block the pores in the vicinity of the outer surface of the porous body, so that the conductive polymer cannot be formed in the internal portion of the porous body.

In a solid electrolytic capacitor, when the amount of the conductive polymer formed in the vicinity of the center of the porous body is smaller than that in the vicinity of the outer surface of the porous body, the ratio of the current capacitance to the expected capacitance based on the entire surface area of the porous body (hereinafter, referred to as "capacitance achievement rate") becomes low. In addition, even if the conductive polymer could be formed uniformly in the vicinity of the center of the porous body and in the vicinity of the outer surface thereof, there may be a problem as follows. When the total amount of the conductive polymer formed in the porous body as a whole is small, the obtained electrolytic capacitor has a large resistance and a large loss as a whole.

SUMMARY OF THE INVENTION

Therefore, with the foregoing in mind, it is an object of the present invention to provide a method for producing an electrolytic capacitor having an improved yield of conductive polymer in a two-solution method that is easily applied for mass production. Furthermore, it is an object of the present invention to provide a method for producing an electrolytic capacitor having an improved capacitance achievement rate for a high frequency band by increasing the amount of the conductive polymer formed in the vicinity of the center of the porous body.

A first method for producing an electrolytic capacitor of the present invention is directed to a method for producing an electrolytic capacitor including a porous body of a valve metal, an oxide film on a surface of the valve metal, and a conductive polymer layer on a surface of the oxide film. The method includes forming the conductive polymer layer on the surface of the oxide film, which includes the steps of dipping the porous body provided with the oxide film in a monomer solution containing a monomer so as to contain the monomer in pores of the porous body; lifting the porous body from the monomer solution and dipping the porous body in an oxidizing solution containing an oxidant; and lifting the porous body from the oxidizing solution and allowing the porous body to stand. In the step of dipping the porous body in the oxidizing solution, a period for which the porous body is dipped in the oxidizing solution is equal to or shorter than a period in which 30% of the monomer contained in the pores of the porous body diffuses and flows into the oxidizing solution.

A second method for producing an electrolytic capacitor of the present invention is directed to a method for producing an electrolytic capacitor including a porous body of a valve metal, an oxide film on a surface of the valve metal, and a conductive polymer layer on a surface of the oxide film. The method includes forming the conductive polymer layer on the surface of the oxide film, which includes the steps of dipping the porous body provided with the oxide film in a monomer solution containing a monomer; and lifting the porous body from the monomer solution and dipping the porous body in an oxidizing solution containing an oxidant. In the step of dipping the porous body in the oxidizing solution, the volume of the oxidizing solution is equal to or less than three times the volume of the apparent porous body.

According to the production methods of the present invention, the amount of the outflow of the monomer contained in the porous body into the oxidizing solution can be reduced, and the yield of the conductive polymer formed in the porous body can be improved.

In the first and second methods of the present invention, when the temperatures of the monomer solution and the oxidizing solution are reduced, the reaction rate between the monomer and the oxidant and the diffusion rates of the monomer and the oxidant are reduced. In this case, however, the reaction rate drops more significantly than the diffusion rate. The present invention utilizes this phenomenon, and at least in the step of dipping the porous body in the solution that is used later, the temperature of the porous body is maintained at a low temperature (e.g.,10° C. or less). When the temperature of the porous body is thus adjusted, a conductive polymer can be formed in the depth of the pores of the porous body efficiently.

According to the present invention, when forming the conductive polymer layer by dipping the porous body in the monomer solution and the oxidizing solution alternately so as to cause oxidation polymerization, the outflow of the component of the solution with which the porous body is first impregnated (the monomer) into the solution in which the porous body is secondly dipped (the oxidizing solution) is suppressed. Thus, the yield of the conductive polymer can be improved. As a result, the conductive polymer layer can be formed in the internal portions of the pores of the porous body with a smaller number of polymerization steps. Furthermore, according to the present invention, the pores in the vicinity of the center of the porous body are coated with the conductive polymer in a high ratio by reducing the reaction rate. Thus, the present invention provides an electrolytic capacitor having an improved capacitance achievement rate, a low resistance and excellent high frequency characteristics.

These and other advantages of the present invention will become apparent to those skilled in the art upon reading and understanding the following detailed description with reference to the accompanying figures.

DESCRIPTION OF THE PREFERRED EMBODIMENTS

In an electrolytic capacitor of the present invention, basically, an anode is formed of a porous body of a valve metal (a metal on which an oxide film is formed), a dielectric layer is constituted by an oxide layer of the valve metal formed on the surface of the valve metal, and a cathode is constituted by a conductive polymer layer.

The porous body of a valve metal includes a large number of pores that are in communication with the outer surface thereof. As a result, the surface area of the porous body is significantly large. Although any metal that has a valve function can be used for the anode, at least one metal selected from the group consisting of aluminum, tantalum, niobium and titanium can be used preferably. Among them, aluminum or tantalum is most preferable. A thin oxide film is formed as a dielectric layer on the surface of the porous body including the surfaces of the pores. A conductive polymer layer is formed on the oxide film as a cathode. The conductive polymer layer is also formed on the surfaces of the pores inside the porous body. This conductive polymer layer is formed by a chemical oxidation polymerization effected by contacting a monomer and an oxidant.

The monomer can be selected among such monomers that can form a conductive polymer by polymerization. A heterocyclic five-membered compound is preferable as the monomer, although it is not particularly limited thereto. More specifically, pyrrole, thiophene, 3-alkyl thiophene, and isothianaphthene are preferable. As for the oxidant, for example, hydrogen peroxide, ferric ion contained in iron sulfate (III) or the like are preferable, although it is not particularly limited thereto.

As for a solution used in the formation of the conductive polymer layer, a monomer solution comprising such monomers as described above and an oxidizing solution comprising an oxidant for polymerization as described above are prepared.

A dopant may be added to either one or both of the solutions in order to improve the conductivity of the conductive polymer. As the dopant, for example, aryl sulfonate ion such as alkyl naphthalene sulfonate, aryl phosphate ion or the like can be used. More specifically, it is preferable to add these ions in the form of a Na salt or other alkali salt to the above-described solutions.

Figure 1:
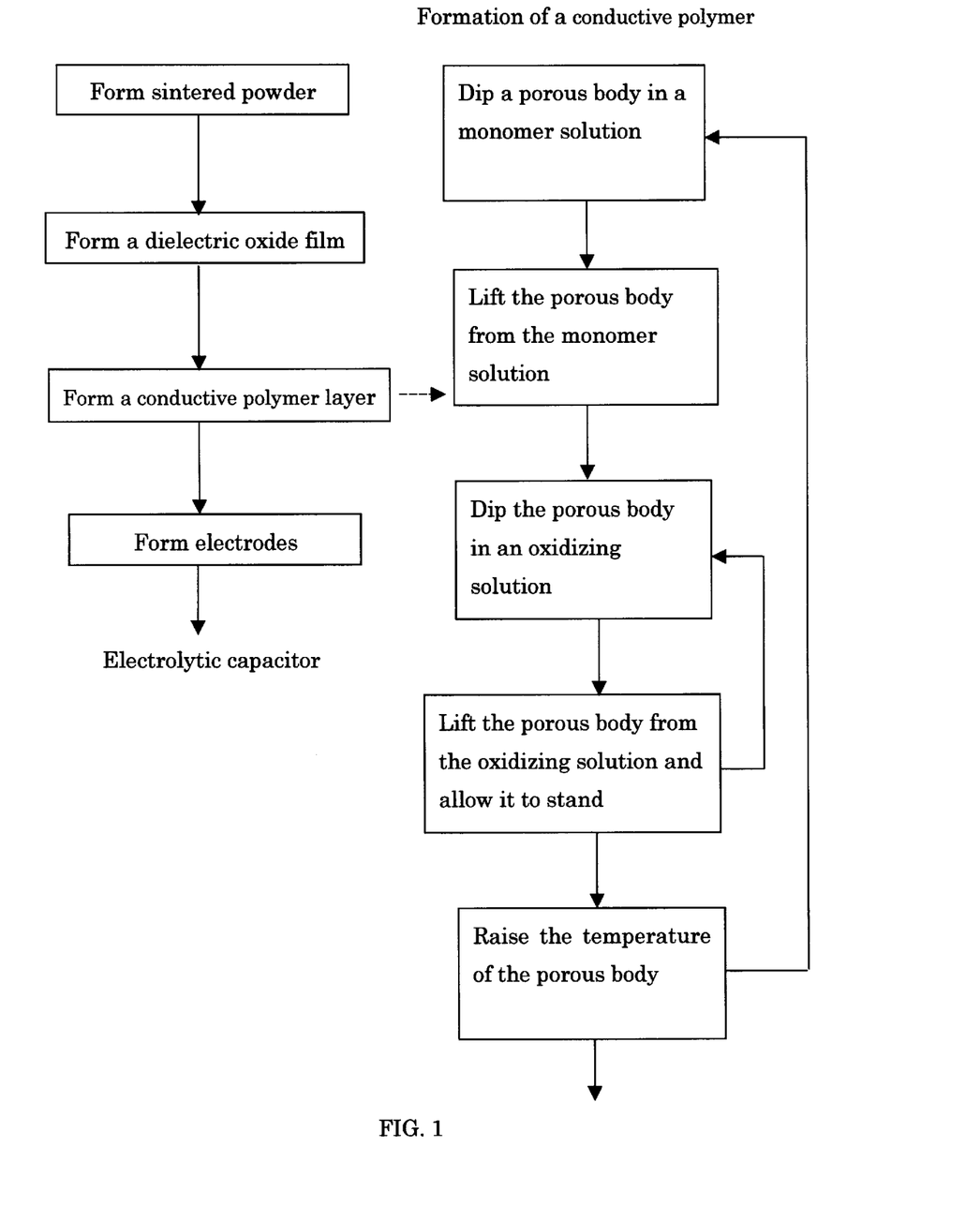
FIG. 1 is a diagram showing a process sequence of a method for producing an electrolytic capacitor in one embodiment of the present invention.

Hereinafter, a first production method of the present invention will be described with reference to the process sequence shown in FIG. 1. As shown in FIG. 1, the method includes the steps of dipping a porous body in a monomer solution so as to impregnate the porous body with the monomer solution, lifting the porous body from the monomer solution, dipping the porous body in an oxidizing solution for a predetermined period of time so as to attach and diffuse the oxidant to the porous body, and lifting the porous body from the oxidizing solution and allowing the same to stand for a predetermined period. These steps are performed in this order. When the oxidant is insufficient with respect to the monomer contained in the porous. body, it is preferable to dip the porous body in the oxidizing solution once again, after the porous body is lifted from the oxidizing solution and allowed to stand.

When the porous body impregnated with the monomer is dipped in the oxidizing solution, the monomer diffuses from the internal portion of the porous body to the surface thereof, and the oxidant diffuses from the outer surface of the porous surface to the internal portion thereof. Then, the monomer and the oxidant react with each other when the monomer and the oxidant are in contact. According to the first production method of the present invention, the porous body is dipped in the oxidizing solution for a limited period. Therefore, the monomer contained in the pores of the porous body is prevented from flowing out of the porous body. Thus, the polymer can be formed efficiently in the pores by oxidation polymerization.

Experiments have confirmed that a preferable period for which the porous body impregnated with the monomer is dipped in the oxidizing solution is equal to or less than a period in which 30% of the monomer contained in the pores of the porous body diffuses and flows away. In this case, the yield of the conductive polymer reaches about 70% or more, and the amount of the expensive monomer used can be reduced significantly. The conventional yield of the conductive polymer is generally about 20%, and the remaining 80% of the monomer reacts with the oxidant in the oxidizing solution, so that the solution is usable only a limited number of times (the life of the solution is short). However, when the dipping period is restricted as described above, "turbidity" of the oxidizing solution resulting from the reaction between the monomer and the oxidant is less likely to occur, and the solution can be used three times or more.

A shorter period for which the porous body impregnated with the monomer is dipped in the oxidizing solution results in a better effect of suppressing the outflow of the monomer. Therefore, it is more preferable to restrict the dipping period within a period in which 20% of the monomer diffuses and flows away. It is most preferable to restrict the dipping period within a period in which 10% of the monomer diffuses and flows away.

In the step of lifting the porous body from the oxidizing solution and allowing the same to stand for a predetermined period, the concentration of the oxidant in the center of the porous body is preferably equal to or more than ¼ of the concentration of the oxidant on the outer surface of the porous body. When the difference in the concentration is reduced, the difference between the amount of the conductive polymer formed in the vicinity of the center of the porous body and that in the vicinity of the outer surface of the porous body can be reduced. Therefore, a capacitance achievement rate in a high frequency band can be improved. In the present specification, the outer surface of the porous body refers to the apparent surface of the porous body, excluding the surfaces formed in the pores inside the porous body. The center of the porous body refers to the area in the internal portion of the porous body that is in communication with the outer surface of the porous body through the pores and that is most distant from the outer surface.

In the above-described method of the present invention, the porous body is not necessarily dipped in the monomer solution and then in the oxidizing solution once for each. For example, when the concentration of the oxidant is desired to be reduced in order to reduce the reaction rate of the monomer, the steps of dipping the porous body in the oxidizing solution and the step of lifting the porous body from the oxidizing solution and allowing the porous body to stand can be successively repeated twice or more so as to supplement the shortage of the amount of the oxidant with respect to the amount of the monomer. In this case, it is preferable to determine the conditions such as a number of times of the repetition and a period for which the porous body is allowed to stand (hereinafter, referred to as "standing period") so that the following requirement can be met. Namely, the concentration of the oxidant in the center of the porous body is equal to or more than ¼ of that on the outer surface of the porous body at least after allowing the porous body to stand in the last step of the repetition.

Thus, after both of the steps are repeated a predetermined number of times, the above-described method is performed under such conditions that the concentration of the oxidant in the porous body is adjusted as described above. This improves the productivity. More specifically, when electrolytic capacitors having equal characteristics are formed by using the oxidant solutions having the same concentration, the repetition of the steps can reduce a lead time, compared to the case where the concentration of the oxidant in the porous body is adjusted as described above after allowing the porous body to stand in only one time of the steps.

Furthermore, especially in the use of more volatile monomer, when the standing period is reduced as described above, it is possible to suppress the volatilization of the monomer introduced into the porous body. The suppression of the volatilization of the monomer results in an improvement in the yield of the conductive polymer, thus leading to an improvement in the characteristics of the capacitor.

Figure 2:
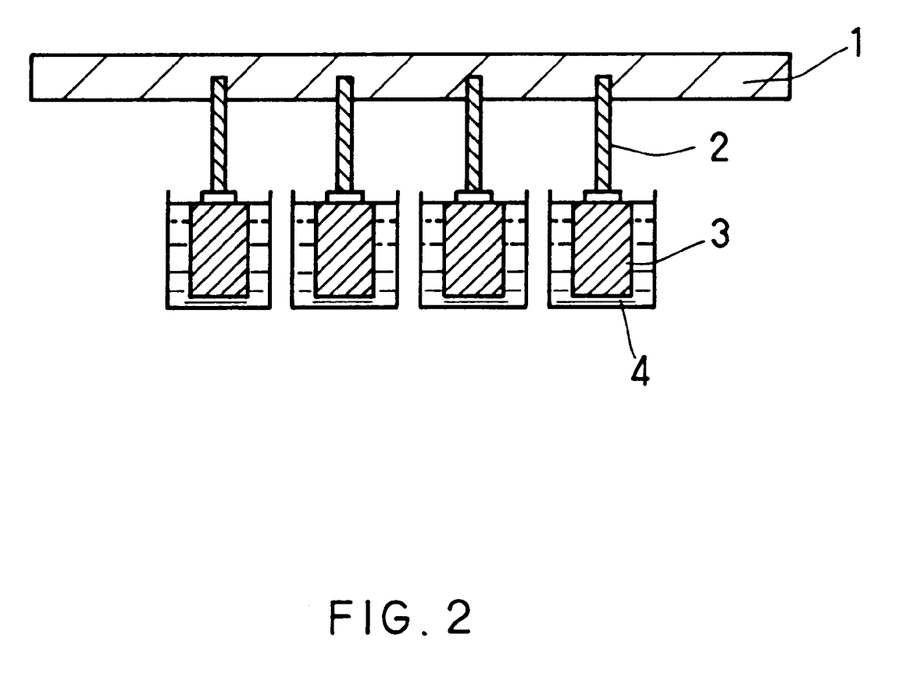
FIG. 2 is a cross-sectional view showing an illustrative apparatus for conducting a method for producing an electrolytic capacitor in one embodiment of the present invention.

Next, a second production method of the present invention will be described with reference to FIG. 2. The second method restricts the range in which a monomer contained in a porous body can diffuse (i.e., the volume of an oxidizing solution in which the porous body is dipped), so that the amount of the monomer flowing from the porous body into the oxidizing solution can be suppressed. More specifically, the volume of the oxidizing solution is preferably restricted within three times the volume of the apparent porous body.

In a conventional apparatus for mass production, a large number of porous bodies are simultaneously dipped in one reaction vessel (polymerization vessel) where an oxidizing solution has been placed earlier, in view of the production efficiency. However, in such an apparatus, it is difficult to perform the second method of the present invention. The restriction in the volume of the oxidizing solution required by the second method of the present invention can be achieved by restricting the number of the porous bodies that are dipped in the reaction vessel. As such a method, as shown in FIG. 2, for example, one reaction vessel (polymerization vessel) 4 containing an oxidizing solution with respect to each porous body 3 is prepared. In the form shown in FIG. 2, a predetermined number of porous bodies 3 are hung from one support (stainless steel ribbon) 1 by tantalum leads 2, each of which corresponds to each porous body 3. One reaction vessel 4 is provided for each porous body 3. In this manner, the second method of the present invention can be performed without compromising the production efficiency.

Figure 3:
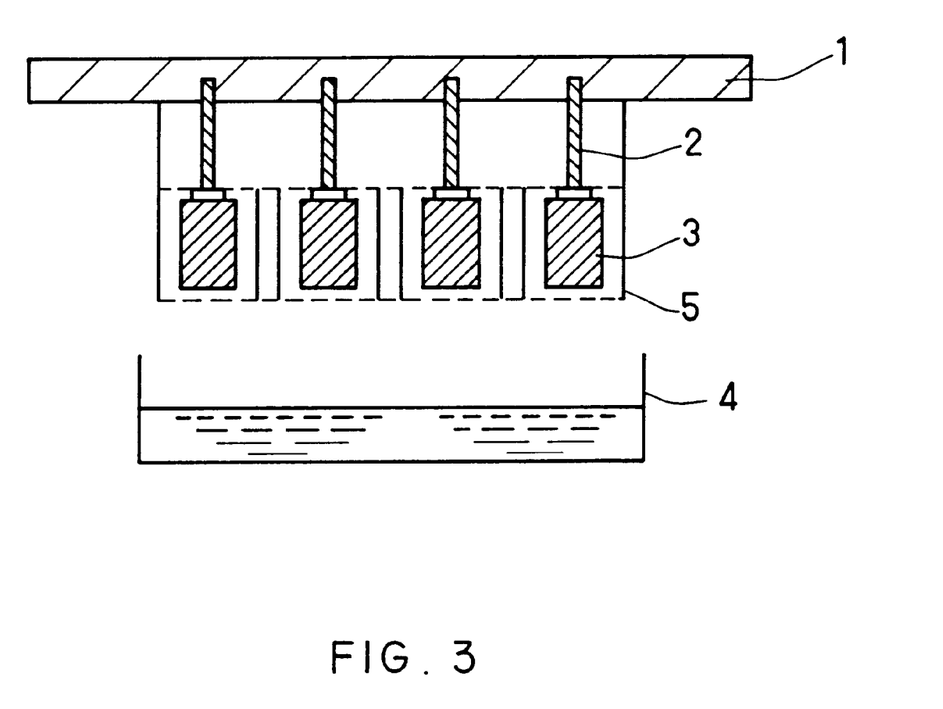
FIG. 3 is a cross-sectional view showing another illustrative apparatus for conducting a method for producing an electrolytic capacitor in one embodiment of the present invention.
Figure 4:
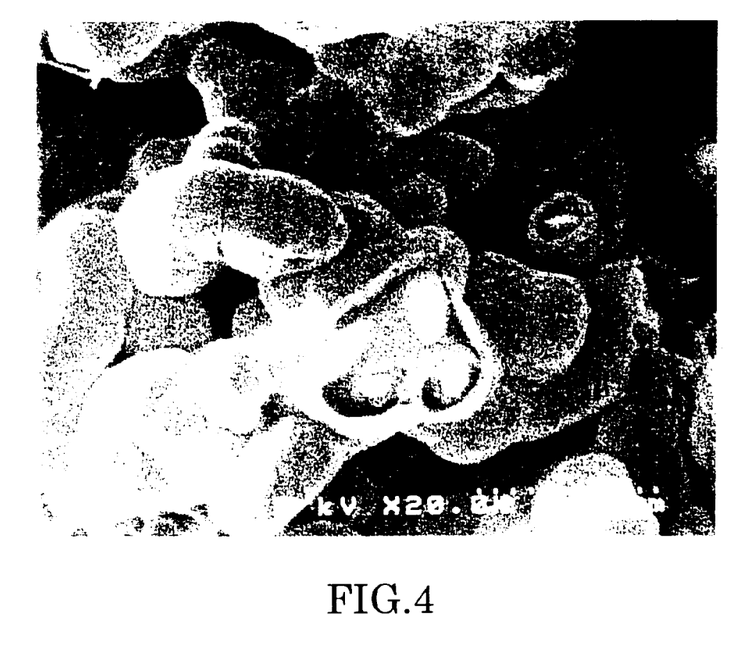
FIG. 4 is a photomicrograph through a scanning electron microscope at a section in the vicinity of the center of an electrolytic capacitor produced with sample 1.
Figure 5:
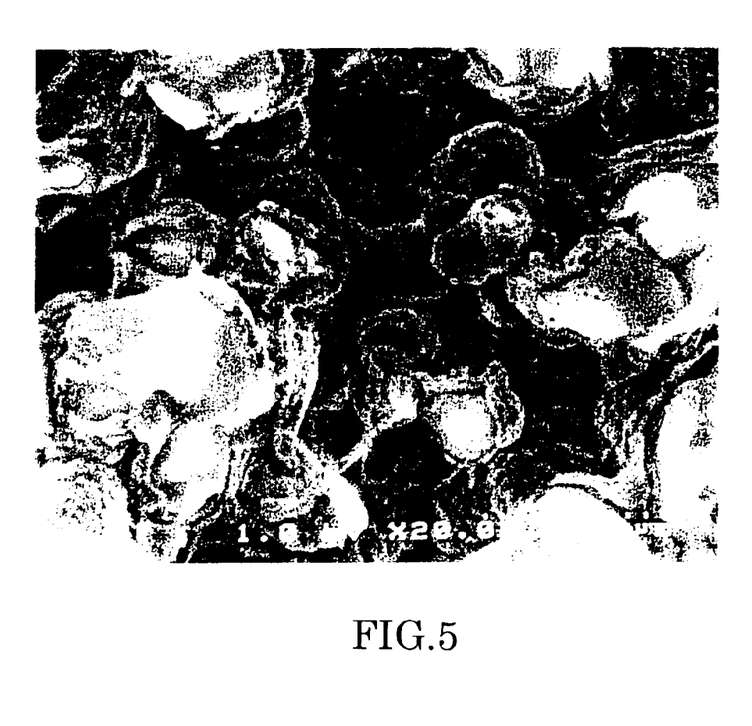
FIG. 5 is a photomicrograph through a scanning electron microscope at a section in the vicinity of the outer surface of an electrolytic capacitor produced with sample 1.
Figure 6:
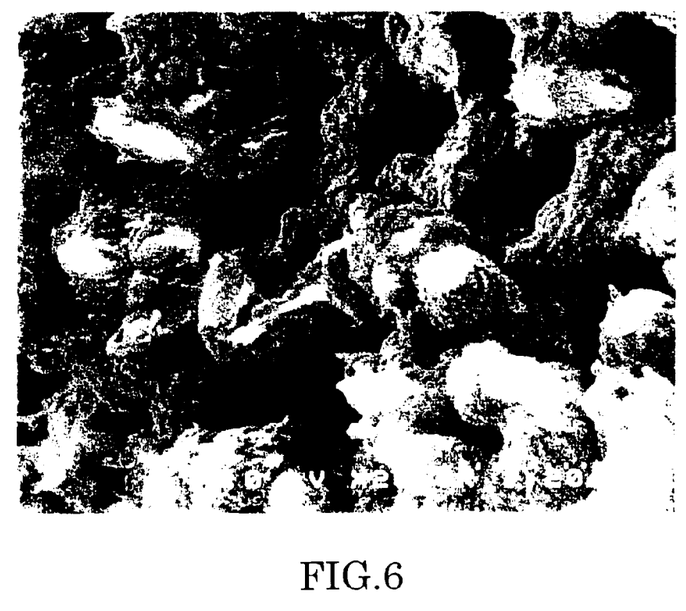
FIG. 6 is a photomicrograph through a scanning electron microscope at a section in the vicinity of the center of an electrolytic capacitor produced with sample 9.
Figure 7:
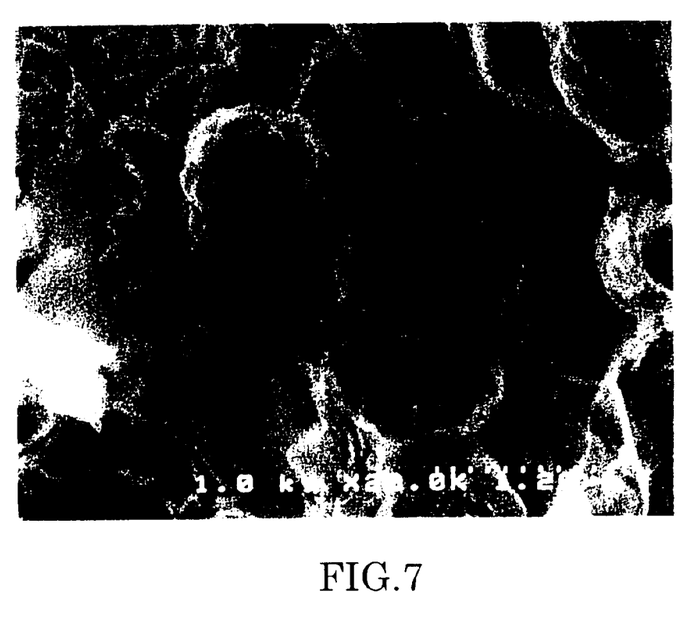
FIG. 7 is a photomicrograph through a scanning electron microscope at a section in the vicinity of the outer surface of an electrolytic capacitor produced with sample 9.

Furthermore, as shown in FIG. 3, a partition 5 for surrounding each porous body 3 may be utilized. With the partition 5, liquid can be let in and out through openings suitably positioned below the porous body, whereas the partition 5 is formed closely on the sides so as to prevent liquid from moving. When the porous body surrounded by the partition 5 and hung from the stainless steel ribbon 1 is dipped in an oxidizing solution in the reaction vessel 4, the reaction vessel is partitioned by the partitions 5 corresponding to the porous bodies 3. Furthermore, the use of the partition 5 is advantageous because the oxidizing solution is placed in one vessel when the partitions are lifted. The use of only one vessel for containing the oxidizing solution facilitates the replacement of the solution, the maintenance in the production process, or the like.

Experiments have confirmed that when the volume of the oxidizing solution is equal to or less than three times the volume of the apparent porous body, and a period for which the porous body is dipped in the oxidizing solution is adjusted so that the concentration of the oxidizing solution in the center of the porous body is equal to or more than ¼ of the concentration on the outer surface thereof, the yield of the conductive polymer is improved to about 60% or more. Thus, according to the second method, the amount of the monomer used can be reduced significantly, as in the first method.

In order to equalize the amount of the conductive polymer in the vicinity of the center of the porous body with that in the vicinity of the outer surface thereof, the following approach is preferable. When the rate at which the oxidant flows and diffuse to the pores of the porous body when the porous body is dipped in the oxidizing solution is referred to as "flow/diffusion rate", and the rate at which the oxidant reacts and disappears in the pores in the porous body is referred to as "reaction/disappearance rate", it is preferable to raise the flow/diffusion rate to be larger than the reaction/disappearance rate. When the flow/diffusion rate is larger than the reaction/disappearance rate, the oxidant reaches the internal portion of the porous body more readily, so that the amount of the conductive polymer formed in the internal portion of the porous body can increase.

In order to raise the flow/diffusion rate of the oxidant, the concentration of the oxidant may be raised. However, a higher concentration of the oxidant results in an increase in the reaction/disappearance rate of the oxidant. In order to reduce the reaction/disappearance rate of the oxidant, it is preferable to reduce the reaction rate at which the monomer and the oxidant reacts with each other. In order to reduce the reaction/disappearance rate of the oxidant, the approaches of reducing the concentration of the solution and reducing the temperature of the solution may be conceivable. However, when the concentration of the solution is reduced, the reaction rate is reduced and the amount of the conductive polymer formed is also reduced.

On the other hand, when the temperature of the solution is reduced, the reaction rate and the diffusion rate are reduced pursuant to Arrhenius' equation. However, the activation energy of the reaction is larger than that of the diffusion, so that the reaction rate depends on the temperature more than the diffusion rate. Therefore, when the temperature of the solution is reduced, the reaction rate drops more significantly than the diffusion rate. When the temperature of the solution is maintained at 10° C., the reaction rate is reduced to about 50% of that at room temperature (20° C.), whereas the diffusion rate is reduced to about 70%. Thus, the flow/diffusion amount of the oxidant can be sufficiently larger than the reaction/disappearance amount of the oxidant by reducing the temperature of the solution. In this case, since the diffusion rate is also reduced, it is desirable to take more time for one treatment. However, the amount of the conductive polymer formed is not significantly reduced.

In the conventional two-solution method, when the reaction rate of the monomer and the oxidant is reduced excessively, the monomer contained in the pores of the porous body flows into the oxidizing solution before participating in the reaction. However, according to the first and second methods of the present invention, the outflow of the monomer can be prevented. In the first and second methods of the present invention, it is preferable that the reaction does not occur until the monomer and the oxidant are mixed to a predetermined extent in the pores in the porous body. Therefore, the temperature of the solution is preferably low, more specifically, preferably 10° C. or less. A lower temperature of the solution is more preferable, as long as it is within the range in which the solution is not solidified, and the substance dissolved in the solution is not precipitated. In the case where the rate of the reaction between the monomer and the oxidant can be reduced significantly, when the concentration of the monomer in the monomer solution and the concentration of the oxidant in the oxidant solution are raised, the amount of the conductive polymer formed for one polymerization can increase.

As described above, the oxidant is sufficiently diffused to the center of the porous body by raising the flow/diffusion amount of the oxidant to be significantly larger than the reaction/disappearance amount thereof. Thus, the conductive polymer formed in the internal portion of the porous body can be uniform. By achieving the uniformity of the formation of the conductive polymer, the capacitance achievement rate of the capacitor can be improved from a conventional value of about 70% to about 90%. Furthermore, the resistance of the electrolyte in the internal portion of the porous body becomes low, so that a capacitance for high frequency band can be obtained efficiently.

Furthermore, after introducing the oxidant into the pores in the porous body while suppressing the reaction between the monomer and the oxidant, it is preferable to promote the reaction between the monomer and the oxidant. Experiments have confirmed that the reaction rate between the monomer and the oxidant becomes twice as high when the temperature is raised by 10° C. Therefore, in the first and second methods, it is preferable to raise the temperature of the porous body after the oxidant has been introduced into the pores by 10° C. or more, more preferably 20° C. or more.

More specifically, in the first and second methods, when the reaction between the monomer and the oxidant is accelerated by raising the temperature of the porous body by 10° C. or more while the porous body is allowed to stand, the polymerization time of the monomer can be reduced to ½ or less. Furthermore, in the second method, the temperature of the porous body may be raised while the porous body is dipped in the oxidizing solution. In the second method, when the temperature of the porous body is raised while the porous body is dipped in the oxidizing solution, the yield of the conductive polymer is improved by about 5%, compared to the case where the temperature of the porous body is raised after the porous body is lifted from the solution. This is because the conductive polymer formed outside the porous body adheres to the porous body. On the other hand, the method of raising the temperature of the porous body after the porous body is lifted from the solution is advantageous because the production facility can be simplified.

In the above description, the porous body is dipped in the monomer solution and then dipped in the oxidizing solution. However, the first and second methods can be performed in the other order of dipping (i.e., the substitution of the solutions with each other). Thus, the present invention encompasses the case of dipping the porous body in the oxidizing solution and then in the monomer solution. In the case, the monomer and the oxidant are substituted for each other in the above description so that the relationship between the monomer and the oxidant is satisfied accordingly. However, in view of the prices of the monomer and the oxidant, it is preferable to use the monomer solution as the first dipping solution, which is relatively hardly contaminated, and use the oxidizing solution as the second dipping solution.

EXAMPLE

Hereinafter, the present invention will be described by way of examples, but the present invention is not limited thereto.

Preparation of a monomer solution: Pyrrole was dissolved in an aqueous solution containing 10 vol % of isopropyl alcohol so that the concentration of pyrrole was 1.0M (mol·dm$^{-3}$). Thus, a monomer solution is prepared.

Preparation of an oxidizing solution: Iron sulfate (III) as an oxidant and alkyl naphthalene sulfonate ion in the form of a Na salt as a dopant were dissolved in an aqueous solution containing 10 vol % of isopropyl alcohol so that the concentration of iron sulfate (III) was 0.25M, and the concentration of alkyl naphthalene sulfonate ion was 0.03M. Thus, an oxidizing solution is prepared.

Formation of a porous body for a capacitor: Tantalum powders together with a lead were subjected to compression molding, and then sintered so as to form a porous body of 1.4 mm×3.0 mm×3.8 mm. Furthermore, the entire surface of this tantalum porous body was subjected to forming of oxide in a phosphoric acid aqueous solution at a formation voltage of 20V, so that an oxide coating layer (dielectric layer) was formed on the surfaces of the pores and the outer surface of the porous body. The inherent electrostatic capacitance of the porous body for a capacitor was measured in a 4M sulfuric acid. The electrostatic capacitance was 180 µF at 120 Hz.

A conductive polymer layer was formed on the dielectric layer of the porous body for a capacitor by a chemical oxidation polymerization method as described later so as to serve as a cathode. A lead was provided on the outer surface of the porous body as a collector of the cathode. Thus, an electrolytic capacitor was produced. The electrostatic capacitance of the electrolytic capacitor was measured at 120 Hz and 100 kHz.

Sample 1: A monomer solution and an oxidizing solution having a temperature of 5° C. were prepared. The porous body was dipped in the monomer solution, and lifted therefrom 5 minutes later. Next, the porous body was dipped in the oxidizing solution, lifted therefrom 10 seconds later, and then allowed to stand in a refrigerator at 5° C. for 5 minutes. These operations (dipping in the oxidizing solution, lifting and standing) were repeated four times. Thereafter, the porous body was allowed to stand in a dryer at 45° C. for 10 minutes to complete the reaction between the monomer and the oxidant. Then, washing and drying were performed. The above-described operations were repeated 8 times so that a conductive polymer layer was formed.

Sample 2: A monomer solution and an oxidizing solution having a temperature of 5° C. were prepared. The porous body was dipped in the monomer solution, and lifted therefrom 5 minutes later. Next, the porous body was dipped in the oxidizing solution, lifted therefrom 10 seconds later, and then allowed to stand in a refrigerator at 5° C. for 2 minutes. These operations (dipping in the oxidizing solution, lifting and standing) were repeated four times. Thereafter, the porous body was allowed to stand in a dryer at 45° C. for 10 minutes to complete the reaction between the monomer and the oxidant. Then, washing and drying were performed. The above-described operations were repeated 8 times so that a conductive polymer layer was formed.

Sample 3: A conductive polymer layer was formed in the same manner as in Sample 2, except that the time for dipping in the oxidizing solution was changed from 10 seconds to 2 minutes.

Sample 4: A conductive polymer layer was formed in the same manner as in Sample 2, except that the time for dipping in the oxidizing solution was changed from 10 seconds to 5 minutes.

Sample 5: A conductive polymer layer was formed in the same manner as in Sample 2, except that the time for standing in the refrigerator at 5° C. was changed from 2 minutes to 1 minute.

Table 1 shows the characteristics of the obtained capacitor. The capacitance achievement rate was calculated with a capacitance measured at 120 Hz on the basis of the above-described measurement result in sulfuric acid.

TABLE 1

|  | Dipping time in oxidizing solution | Standing period | Capacitance 120 Hz [µF] | Capacitance 100 kHz [µF] | Capacitance achievement rate [%] |
| --- | --- | --- | --- | --- | --- |
| Sample 1 | 10 sec. | 5 min. | 166 | 145 | 92 |
| Sample 2 | 10 sec. | 2 min. | 168 | 148 | 93 |
| Sample 3 | 2 min. | 2 min. | 160 | 140 | 89 |
| Sample 4 | 5 min. | 2 min. | 120 | 80 | 67 |
| Sample 5 | 10 sec. | 1 min. | 140 | 100 | 78 |
| Sample 9 | 15 min. | — | 140 | 80 | 78 |

Sample 6: As shown in FIG. 2, vessels containing an oxidizing solution, each of which corresponds to one porous body, were prepared. The amount of the oxidizing solution was three times the volume of the apparent porous body. A monomer solution and the oxidizing solution were maintained at 5° C., as in the above samples. The porous body was dipped in the monomer solution, and lifted therefrom 5 minutes later. Next, the porous body was dipped in the oxidizing solution and allowed to stand for 15 minutes. Thereafter, the porous body was lifted from the oxidizing solution, and then washing and drying were performed, after the completion of the reaction between the monomer and the oxidant while standing in a dryer at 45° C. for 10 minutes. These operations were repeated 8 times. Thus, a conductive polymer layer was formed.

Sample 7: A conductive polymer layer was formed in the same manner as in Sample 6, except that the amount of the oxidizing solution was changed from three times the volume of the apparent porous body to twice the volume thereof.

Sample 8: A conductive polymer layer was formed in the same manner as in Sample 6, except that the amount of the oxidizing solution was changed from three times the volume of the apparent porous body to ten times the volume thereof.

Table 2 shows the characteristics of the obtained capacitor. The capacitance achievement rate was calculated in the same manner as described above.

TABLE 2

|  | | Capacitance | |
| --- | --- | --- | --- |
| | Volume ratio of oxidizing solution to apparent porous body | 120 Hz [$\mu$F] | 100 kHz [$\mu$F] | Capacitance achievement rate [%] |
| Sample 6 | 3 | 155 | 133 | 86 |
| Sample 7 | 2 | 160 | 135 | 89 |
| Sample 8 | 10 | 125 | 83 | 69 |
| Sample 9 | — | 140 | 80 | 78 |

Sample 9: A monomer solution and an oxidizing solution having a temperature of 25° C. were prepared. The volume of the oxidizing solution was significantly beyond three times the volume of the apparent porous body. The porous body was dipped in the monomer solution and lifted therefrom 5 minutes later. Next, the porous body was dipped in the oxidizing solution, and allowed to stand for 15 minutes. At this point, the reaction was substantially completed. Thereafter, the porous body was lifted from the oxidizing solution, and then washing and drying were performed. These operations were repeated 15 times. Thus, a conductive polymer layer was formed.

The porous bodies for an electrolytic capacitor produced with samples 1 and 9 were cut, and observed through a scanning electron microscope to investigate the conductive polymer formed at the section. FIGS. 4 to 7 show the results. Comparing these photomicrographs shown in FIGS. 4 to 7 with each other, it can be confirmed that the conductive polymer of sample 1 is formed sufficiently in the center of the porous body, although polymerization was repeated fewer times when producing sample 1 than sample 9.

Furthermore, as a result of the measurement of the outflow ratio of the monomer into the oxidizing solution, 10% for samples 1, 2, and 5, 30% for sample 3, 50% for sample 4, and 70% for sample 9 were obtained. The outflow ratio indicates the ratio of the amount of the monomer that has flowed away to the amount of the monomer contained in the pores of the porous body.

The monomer outflow ratio was determined by dipping the porous body impregnated with the monomer in 100 ml of pure water in place of the oxidizing solution, and measuring the concentration of the monomer contained in the pure water by gas chromatography.

Furthermore, in sample 1, the concentration of the oxidant in the center of the porous body was 1/3 of that on the outer surface thereof, after the porous body was lifted from the oxidizing solution and allowed to stand for 5 minutes in the fourth sequence of the steps in the four-time-repetition. In samples 2, 3 and 4, the concentration of the oxidant in the center of the porous body was 1/4 of that on the outer surface thereof, after the porous body was lifted from the oxidizing solution and allowed to stand for 2 minutes in the fourth sequence of the steps in the four-time-repetition. In sample 5, the concentration of the oxidant in the center of the porous body was 1/6 of that on the outer surface thereof, after the porous body was lifted from the oxidizing solution and allowed to stand for 1 minute in the fourth sequence of the steps in the four-time-repetition.

The concentration of the oxidant in the center of the porous body was measured in the following manner. The porous body was lifted from the oxidizing solution and allowed to stand for a predetermined period. Then, the porous body was frozen by liquid nitrogen. Thereafter, a segment was cut out from the center of the porous body so that the shape thereof was similar to that of the porous body and the volume thereof was 1/8 of the volume of the porous body. Then, the concentration of the oxidant contained in the device center segment was quantified chemically. The concentration of the oxidant on the surface of the porous body was measured by chemically quantifying the concentration of the oxidant in the oxidizing solution adhering to the outer surface of the porous body device.

Hereinafter, the results of the examples will be further examined.

In sample 2, the porous body was allowed to stand for a shorter period after being lifted from the oxidizing solution, compared to sample 1. Therefore, the volatilization of the monomer was suppressed. Accordingly, the capacitance achievement rate and the characteristics for high frequency were both better in sample 2 than those in sample 1. In addition, the standing time in sample 2 was shortened by 60% of that in sample 1.

Figure 8:
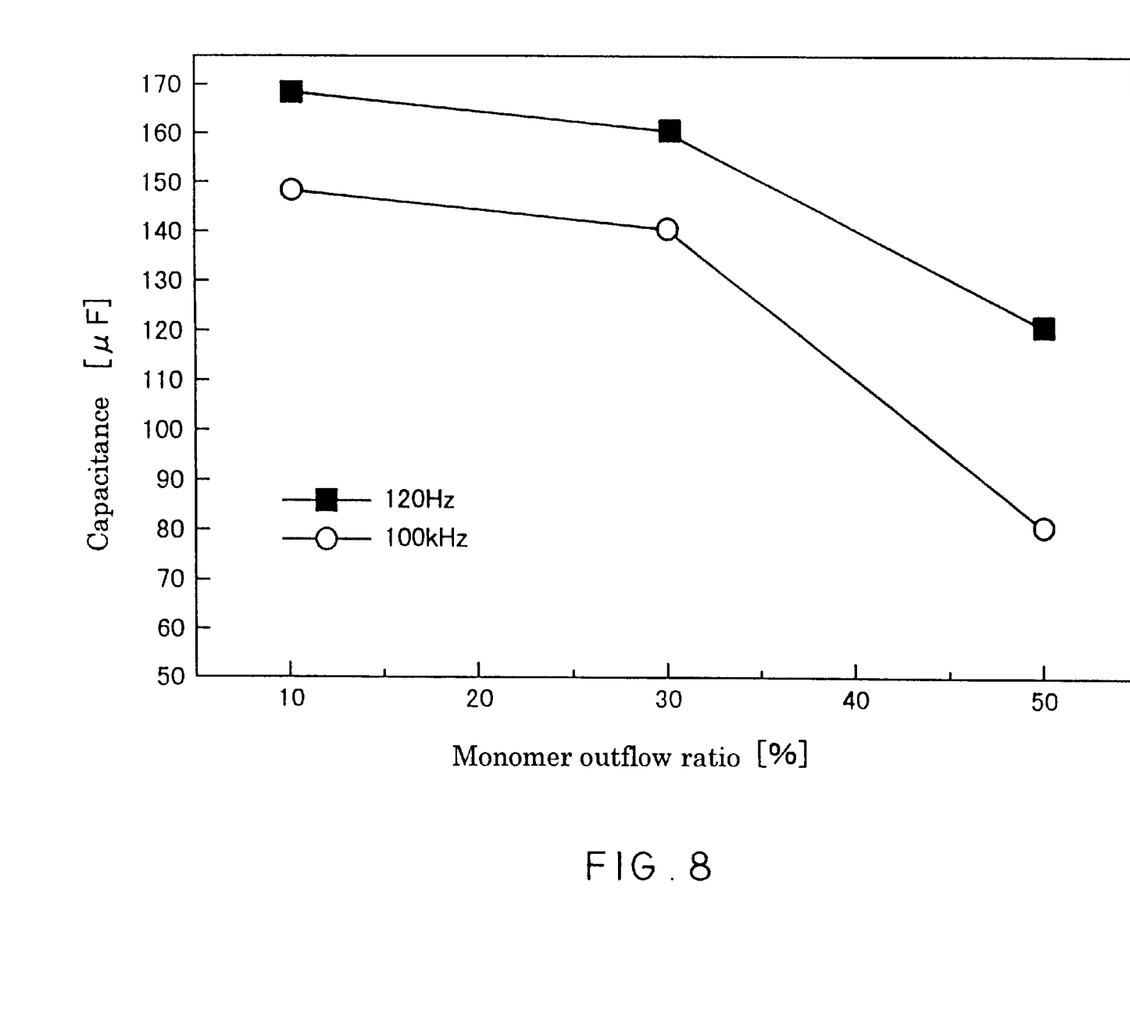
FIG. 8 is a graph showing the relationship between the amount of the outflow of a monomer into an oxidizing solution and the capacitance of the obtained electrolytic capacitor in one embodiment of the production method of the present invention.

FIG. 8 shows the relationship between the monomer outflow ratio and the capacitance of the electrolytic capacitor, based on the results of samples 2 to 4. This graph in FIG. 8 indicates that it is preferable to restrict the period for dipping the porous body in the oxidizing solution within a period in which 30% of the monomer contained in the pores in the porous body flows away.

Figure 9:
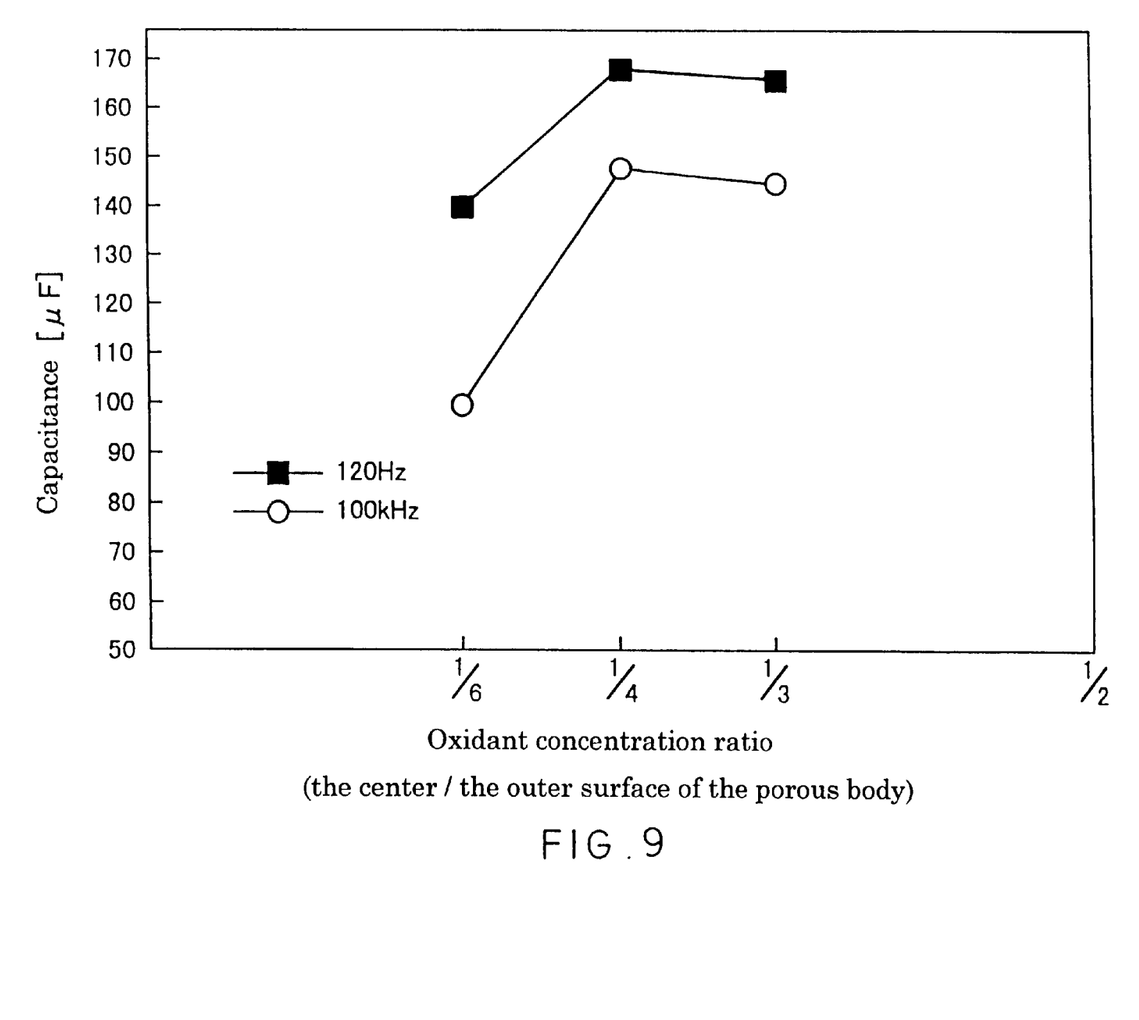
FIG. 9 is a graph showing the relationship between the ratio of the concentration of an oxidant in a center of a porous body to the concentration of the oxidant on the outer surface of the porous body and the capacitance of the obtained electrolytic capacitor in one embodiment of the production method of the present invention.

FIG. 9 shows the relationship between the concentration of the oxidant in the center of the porous body and the capacitance of the electrolytic capacitor, based on the results of samples 1 to 3. This graph in FIG. 9 indicates that it is preferable that the concentration of the oxidant in the center of the porous body is equal to or more than 1/4 of the concentration of the oxidant on the outer surface of the porous body.

Figure 10:
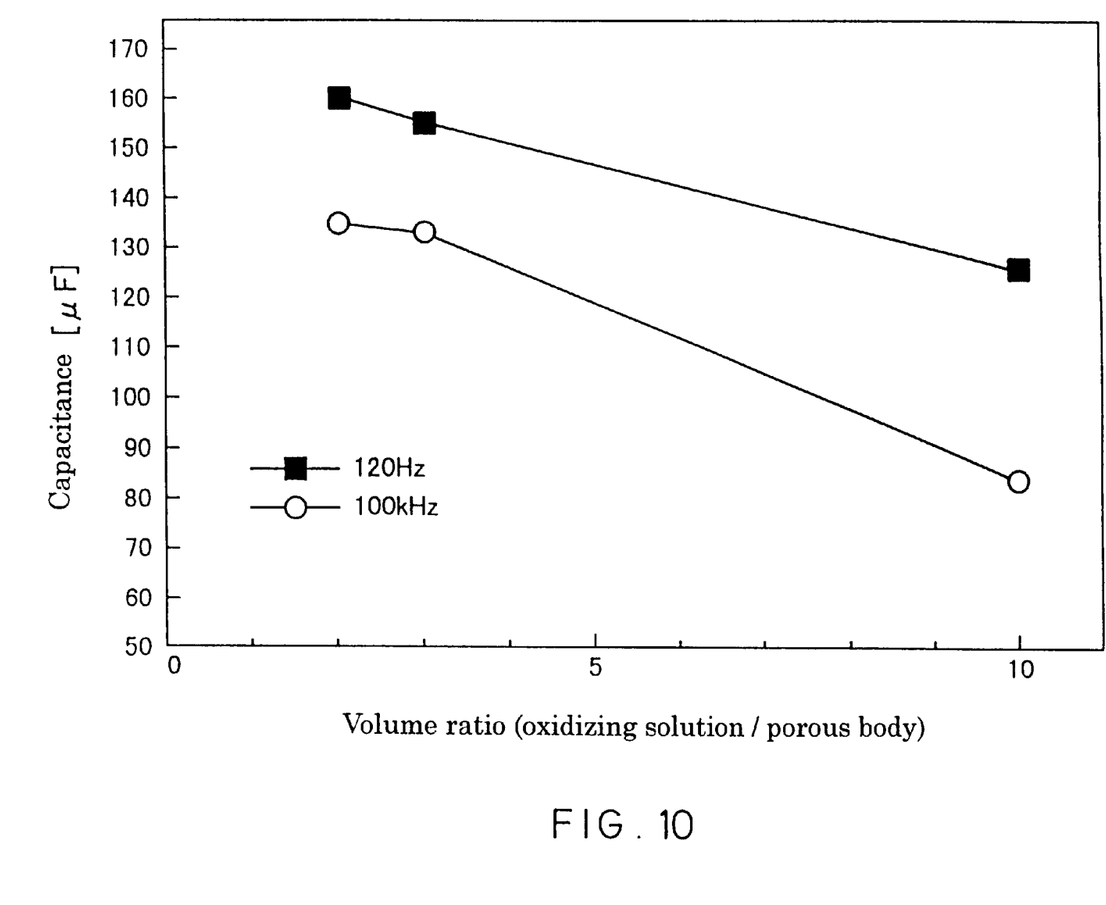
FIG. 10 is a graph showing the relationship between the volume ratio of the volume of an oxidizing solution to the apparent volume (containing the pores) of a porous body and the capacitance of the obtained electrolytic capacitor in one embodiment of the production method of the present invention.

FIG. 10 shows the relationship between the volume of the oxidizing solution and the capacitance of the electrolytic capacitor, based on the results of samples 6 to 8. This graph in FIG. 10 indicates that it is preferable to restrict the volume of the oxidizing solution to a volume equal to or less than three times the volume of the apparent porous body, in order to suppress the diffusion of the monomer by reducing the volume of the oxidizing solution.

The invention may be embodied in other forms without departing from the spirit or essential characteristics thereof.

The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A method for producing an electrolytic capacitor including a porous body of a valve metal, an oxide film on a surface of the valve metal, and a conductive polymer layer on a surface of the oxide film,
the method comprising forming the conductive polymer layer on the surface of the oxide film, which comprising the steps of:
dipping the porous body provided with the oxide film in a monomer solution containing a monomer so as to contain the monomer in pores of the porous body;
lifting the porous body from the monomer solution and dipping the porous body in an oxidizing solution containing an oxidant; and
lifting the porous body from the oxidizing solution and allowing the porous body to stand,
wherein in the step of dipping the porous body in the oxidizing solution, a period for which the porous body is dipped in the oxidizing solution is equal to or shorter than a period in which 30% of the monomer contained in the pores of the porous body diffuses and flows into the oxidizing solution.

2. The method for producing an electrolytic capacitor according to claim 1, wherein in the step of lifting the porous body from the oxidizing solution and allowing the porous body to stand, a concentration of the oxidant in a center of the porous body is equal to or more than ¼ of a concentration of the oxidant on an outer surface of the porous body.

3. The method for producing an electrolytic capacitor according to claim 1, wherein the step of dipping the porous body in the oxidizing solution and the step of lifting the porous body from the oxidizing solution and allowing the porous body to stand are repeated twice or more, and
at least in the last step of the repetition of lifting the porous body from the oxidizing solution and allowing the porous body to stand, a concentration of the oxidant in a center of the porous body is equal to or more than ¼ of a concentration of the oxidant on an outer surface of the porous body.

4. The method for producing an electrolytic capacitor according to claim 1, wherein in the step of dipping the porous body in the oxidizing solution, a temperature of the porous body is maintained at 10° C. or less.

5. The method for producing an electrolytic capacitor according to claim 1, wherein in the step of lifting the porous body from the oxidizing solution and allowing the porous body to stand, a temperature of the porous body is maintained at 10° C. or less.

6. The method for producing an electrolytic capacitor according to claim 1, further comprising the step of raising a temperature of the porous body by 10° C. or more, after the step of lifting the porous body from the oxidizing solution and allowing the porous body to stand.

7. The method for producing an electrolytic capacitor according to claim 1, wherein the steps of forming the conductive polymer layer are repeated twice or more.

8. The method for producing an electrolytic capacitor according to claim 1, wherein the monomer is selected from the group consisting of a heterocyclic five-membered compound or derivatives thereof.

9. The method for producing an electrolytic capacitor according to claim 1, wherein the valve metal comprises at least one metal selected from the group consisting of aluminum, tantalum, niobium and titanium.

10. A method for producing an electrolytic capacitor including a porous body of a valve metal, an oxide film on a surface of the valve metal, and a conductive polymer layer on a surface of the oxide film,
the method comprising forming the conductive polymer layer on the surface of the oxide film, which comprising the steps of:
dipping the porous body provided with the oxide film in a monomer solution containing a monomer; and
lifting the porous body from the monomer solution and dipping the porous body in an oxidizing solution containing an oxidant,
wherein in the step of dipping the porous body in the oxidizing solution, a volume of the oxidizing solution is equal to or less than three times an apparent volume of the porous body.

11. The method for producing an electrolytic capacitor according to claim 10, wherein in the step of dipping the porous body in the oxidizing solution, a concentration of the oxidant in a center of the porous body is equal to or more than ¼ of a concentration of the oxidant on an outer surface of the porous body.

12. The method for producing an electrolytic capacitor according to claim 10, wherein in the step of dipping the porous body in the oxidizing solution, a temperature of the porous body is maintained at 10° C. or less.

13. The method for producing an electrolytic capacitor according to claim 10, further comprising the step of raising a temperature of the porous body by 10° C. or more while or after the porous body is dipped in the oxidizing solution.

14. The method for producing an electrolytic capacitor according to claim 11, wherein the steps of forming the conductive polymer layer are repeated twice or more.

15. The method for producing an electrolytic capacitor according to claim 10, wherein the monomer is selected from the group consisting of a heterocyclic five-membered compound or derivatives thereof.

16. The method for producing an electrolytic capacitor according to claim 10, wherein the valve metal comprises at least one metal selected from the group consisting of aluminum, tantalum, niobium and titanium.

17. A method for producing an electrolytic capacitor including a porous body of a valve metal, an oxide film on a surface of the valve metal, and a conductive polymer layer on a surface of the oxide film,
the method comprising forming the conductive polymer layer on the surface of the oxide film, which comprising the steps of:
dipping the porous body provided with the oxide film in an oxidizing solution containing an oxidant so as to contain the oxidant in pores of the porous body;
lifting the porous body from the oxidizing solution and dipping the porous body in a monomer solution containing a monomer; and
lifting the porous body from the monomer solution and allowing the porous body to stand,
wherein in the step of dipping the porous body in the monomer solution, a period for which the porous body is dipped in the monomer solution is equal to or shorter than a period in which 30% of the oxidant contained in the pores of the porous body diffuses and flows into the monomer solution.

18. The method for producing an electrolytic capacitor according to claim 17, wherein in the step of lifting the porous body from the monomer solution and allowing the porous body to stand, a concentration of the monomer in a center of the porous body is equal to or more than ¼ of a concentration of the monomer on an outer surface of the porous body.

19. The method for producing an electrolytic capacitor according to claim 17, wherein the step of dipping the porous body in the monomer solution and the step of lifting the porous body from the monomer solution and allowing the porous body to stand are repeated twice or more, and at least in the last step of the repetition of lifting the porous body from the monomer solution and allowing the porous body to stand, a concentration of the monomer in a center of the porous body is equal to or more than ¼ of a concentration of the monomer on an outer surface of the porous body.

20. The method for producing an electrolytic capacitor according to claim 17, wherein in the step of dipping the porous body in the monomer solution, a temperature of the porous body is maintained at 10° C. or less.

21. The method for producing an electrolytic capacitor according to claim 17, wherein in the step of lifting the porous body from the monomer solution and allowing the porous body to stand, a temperature of the porous body is maintained at 10° C. or less.

22. The method for producing an electrolytic capacitor according to claim 17, further comprising the step of raising a temperature of the porous body by 10° C. or more, after the step of lifting the porous body from the monomer solution and allowing the porous body to stand.

23. The method for producing an electrolytic capacitor according to claim 17, wherein the steps of forming the conductive polymer layer are repeated twice or more.

24. The method for producing an electrolytic capacitor according to claim 17, wherein the monomer is selected from the group consisting of a heterocyclic five-membered compound or derivatives thereof.

25. The method for producing an electrolytic capacitor according to claim 17, wherein the valve metal comprises at least one metal selected from the group consisting of aluminum, tantalum, niobium and titanium.

26. A method for producing an electrolytic capacitor including a porous body of a valve metal, an oxide film on a surface of the valve metal, and a conductive polymer layer on a surface of the oxide film, the method comprising forming the conductive polymer layer on the surface of the oxide film, which comprising the steps of:

dipping the porous body provided with the oxide film in an oxidizing solution containing an oxidant; and lifting the porous body from the oxidizing solution and dipping the porous body in a monomer solution containing a monomer, wherein in the step of dipping the porous body in the monomer solution, a volume of the monomer solution is equal to or less than three times an apparent volume of the porous body.

27. The method for producing an electrolytic capacitor according to claim 26, wherein in the step of dipping the porous body in the monomer solution, a concentration of the monomer in a center of the porous body is equal to or more than ¼ of a concentration of the monomer on an outer surface of the porous body.

28. The method for producing an electrolytic capacitor according to claim 26, wherein in the step of dipping the porous body in the monomer solution, a temperature of the porous body is maintained at 10° C. or less.

29. The method for producing an electrolytic capacitor according to claim 26, further comprising the step of raising a temperature of the porous body by 10° C. or more while or after the porous body is dipped in the monomer solution.

30. The method for producing an electrolytic capacitor according to claim 26, wherein the steps of forming the conductive polymer layer are repeated twice or more.

31. The method for producing an electrolytic capacitor according to claim 26, wherein the monomer is selected from the group consisting of a heterocyclic five-membered compound or derivatives thereof.

32. The method for producing an electrolytic capacitor according to claim 26, wherein the valve metal comprises at least one metal selected from the group consisting of aluminum, tantalum, niobium and titanium.

33. An electrolytic capacitor including a porous body of a valve metal, an oxide film on a surface of the valve metal, and a conductive polymer layer on a surface of the oxide film, the conductive polymer layer being formed by a method comprising steps of:

dipping the porous body provided with the oxide film in a monomer solution containing a monomer so as to contain the monomer in pores of the porous body;

lifting the porous body from the monomer solution and dipping the porous body in an oxidizing solution containing an oxidant; and lifting the porous body from the oxidizing solution and allowing the porous body to stand, wherein in the step of dipping the porous body in the oxidizing solution, a period for which the porous body is dipped in the oxidizing solution is equal to or shorter than a period in which 30% of the monomer contained in the pores of the porous body diffuses and flows into the oxidizing solution.

34. An electrolytic capacitor including a porous body of a valve metal, an oxide film on a surface of the valve metal, and a conductive polymer layer on a surface of the oxide film, the conductive polymer layer being formed by a method comprising the steps of:

dipping the porous body provided with the oxide film in a monomer solution containing a monomer; and lifting the porous body from the monomer solution and dipping the porous body in an oxidizing solution containing an oxidant, wherein in the step of dipping the porous body in the oxidizing solution, a volume of the oxidizing solution is equal to or less than three times a volume of the apparent porous body.

35. An electrolytic capacitor including a porous body of a valve metal, an oxide film on a surface of the valve metal, and a conductive polymer layer on a surface of the oxide film, the conductive polymer layer being formed by a method comprising steps of:

dipping the porous body provided with the oxide film in an oxidizing solution containing an oxidant so as to contain the oxidant in pores of the porous body;

lifting the porous body from the oxidizing solution and dipping the porous body in a monomer solution containing a monomer; and lifting the porous body from the monomer solution and allowing the porous body to stand, wherein in the step of dipping the porous body in the monomer solution, a period for which the porous body is dipped in the monomer solution is equal to or shorter than a period in which 30% of the oxidant contained in the pores of the porous body diffuses and flows into the monomer solution.

36. An electrolytic capacitor including a porous body of a valve metal, an oxide film on a surface of the valve metal, and a conductive polymer layer on a surface of the oxide film, the conductive polymer layer being formed by a method comprising the steps of:

dipping the porous body provided with the oxide film in an oxidizing solution containing an oxidant; and lifting the porous body from the oxidizing solution and dipping the porous body in a monomer solution containing a monomer, wherein in the step of dipping the porous body in the monomer solution, a volume of the monomer solution is equal to or less than three times a volume of the apparent porous body.

* * * * *